Feb. 10, 1948.   N. FERRAEZ, JR   2,435,578
APPARATUS FOR COLLECTING LIQUID SEDIMENTS
Filed Aug. 18, 1944
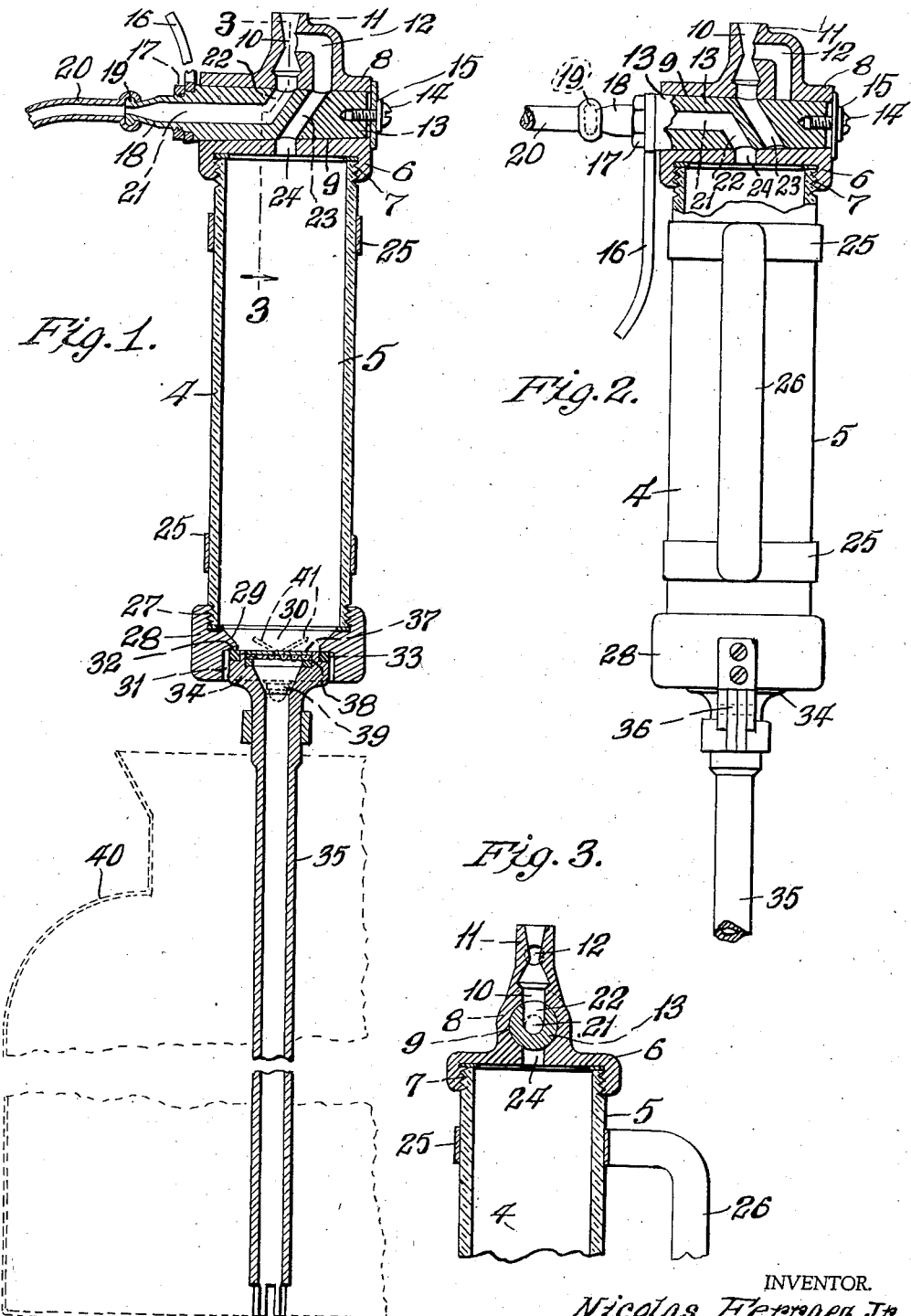
INVENTOR.
Nicolas Ferraez Jr.
BY Herbert G. Fletcher
atty.

Patented Feb. 10, 1948

2,435,578

UNITED STATES PATENT OFFICE 2,435,578

APPARATUS FOR COLLECTING LIQUID SEDIMENTS

Nicolas Ferraez, Jr., St. Louis, Mo.

Application August 18, 1944, Serial No. 550,011

4 Claims. (Cl. 73—61)

This invention relates to an apparatus for collecting liquid sediments and is a furthering of the invention disclosed in my pending U. S. application filed June 19, 1944, under Serial No. 540,970, this application however providing a more simple and consequently a less expensive structure of apparatus for sediment testing purposes.

One of the objects of the invention therefore is to provide a hand carried apparatus which is also hand operable.

Another object is to provide the container of the apparatus with a hand operated control valve.

A further object is to combine a double acting control valve with and as forming a part of a hand carried collecting container.

Still another object is to provide a hand carried container with a valve, which when coupled with a pressure line, can be operated to both entrain and discharge liquid or fluid into and from the container for testing purposes.

Other objects and advantages will appear as this description progresses and by reference to the drawing in which:

Figure 1 is a vertical sectional elevation taken through this improved apparatus with an intermediate part of the nozzle thereof broken away and showing its relation to a milk can which is shown in dotted lines.

Figure 2 is a side elevation of the apparatus partly shown in section and with the lower end of the nozzle broken away.

Figure 3 is a fragmentary vertical sectional elevation taken approximately on the line 3—3 of Fig. 1.

This improved collecting apparatus is primarily intended for drawing small milk quantities from shipments delivered to dairies from dairy farms or the like for sediment testing of the milk deliveries.

Referring by numerals to the drawing, this improved apparatus comprises a container 4 having a transparent glass or plastic cylinder 5 with an upper head 6 secured thereto by the threads 7, and the head having a body portion 8 through which a tapered bore 9 is longitudinally disposed at a right angle to the vertical disposition of the cylinder 5.

Leading from the bore 9 is a discharge passageway 10 which is formed through an outlet extension 11 of the body portion 8, and in communication with the passageway 10 is a right angular passageway 12 which is also in communication with the bore 9.

Mounted in the bore 9 of the body portion 8 is a tapered valve 13 which is secured in the bore by the screw 14 and the co-operating washer 15 at the small end of the valve and secured to the other end of the valve is an operating handle 16.

The handle 16 is held in secured position on the valve 13 by a lock-nut 17 which is mounted on the extension 18 of the valve and secured on the beaded part 19 is one end of a flexible hose or tube 20 which leads from an air pressure source (not shown).

Formed in the extension 18 and a part of the valve 13 is a longitudinally extending passageway 21 having an angular part 22 which is adapted to communicate with the discharge passageway 10 in the outlet extension 11, and formed in said valve beyond or inwardly of the part 22 of the passageway 21 and approximately parallel therewith, and crossing the valve, is a discharge passageway 23, said passageway 23 being adapted to simultaneously communicate at one end with an opening 24 in the cylinder head 6 and at its other end with the passageway 12, in the manner as shown in Fig. 1.

Secured to the cylinder 5 of the container 4 is a pair of bands 25 for the support of the carrying handle 26 and secured to the lower end of the cylinder by screw threads 27 is a body portion 28 in which is formed a downwardly tapering circular wall 29 and secured at its ends to said wall is a transverse bar 30 which is triangular in shape in cross section to provide a knife-edge on its lower end.

A pocket 31 is formed on the underside of the body portion 28 and which is of a size to form an annular shoulder 32, said shoulder forming a seat for a gasket 33 on the head 34 of a depending nozzle 35 through which milk quantities to be tested for sediments are entrained to the container 4 and subsequently discharged therethrough from the container after collecting the sediments.

The head 34 with its depending nozzle or tube 35 is swingably connected to the head 28 by the hinge 36.

In the operation of the apparatus for testing and grading milk after its delivery to the dairies in cans or the like from farms, a porous disc 37 is inserted in the seat 38 which is formed in the head 34, this being done by the operator releasing the head latch 39, from under engagement with the head 34 of the nozzle 35 and allowing the head and nozzle to swing away from the body portion 28 of the container 4, by the operator inclining the container while holding it by the handle 26.

The container 4 is then swung into a vertical position to allow the head 34 to swing back into the pocket 31 of the body portion 28 of the container and the latch 39 on said body portion is manipulated to under engage the head 34 to secure the gasket 33 against the shoulder 32 of the body portion 28.

The nozzle 35 is then engaged in the can 40 and the lower end thereof may rest on the can bottom and the operator then engages the lever 16 of the valve 13 and turns the valve to the position shown in Fig. 1 wherein the angular part 22 of the passageway 21 will communicate with the discharge passageway 10 in the outlet extension 11 on the body portion 8 of the head 6. In this position of the valve, the passageway 23 will be in communication with both the passageway 12 and the opening 24 in the cylinder head 5, and inasmuch as fluid pressure is maintained in the flexible tube 20, the discharge pressure from the tube, through the passageway 21, its part 22 and the discharge passageway 10, a suction will be created in the angular passageway 12, the passageway 23 and the opening 24 thereby creating a vacuum in the container 4.

The suction or vacuum created in the container 4, will cause a portion 41 on each side of the transverse bar 30 of the disc 37, to be drawn upwardly from the disc seat 38 in the manner shown in dotted lines in Fig. 1, and a quantity of milk from the can 40 will be entrained through the nozzle 35 to the container 4, past the uplifted portions 41 of the porous disc 37.

As the cylinder 5 of the container 4 is of transparent material, the operator can readily judge when a sufficient milk quantity has been entrained into the container, and at that instant the operator will actuate the lever 16 to turn the valve 13 approximately 180 degrees to dispose the passageway 23 in a cut-off or out of alinement position with respect to the passageway 12 and the opening 24, to dispose the angular part 22 of the passageway 21 in alinement with said opening 24 to permit air pressure from the hose 20 to enter the cylinder 5 against the milk quantity therein, thus causing the upwardly bent portions 41 of the disc 37 to be forced downwardly against the seat 38, and the entrained milk quantity in the cylinder will be forced through the flattened porous disc and returned to the can 40 through the nozzle 35.

The forcing of the entrained milk in the container 4 through the disc 37 will cause the heavy particles or sediment to be caught and retained by the disc by reason of its porosity, the sediment loaded disc then being removed from its seat 38 in the head 34 and retained for subsequent inspection by chemists and the like to determine of what the collected sediment or foreign matter consists for an accurate grading of the milk to which the disc appertains.

Obviously, after returning the entrained milk from the container 4 to the can after collecting sediment therefrom, the valve 13 is manipulated to a cut-off position with respect to disengaging the passageway 21 from communication with the opening 24 in the cylinder 5.

Successive like operations of disc insertion on the seat 38 of the head 34 for collecting sediment from individual milk shipments may be followed, and in so doing, the operator by carrying the apparatus in one hand for inserting the nozzle 35 thereof in respective shipments, can readily move around and among the cans in the event the air pressure tube 20 is of sufficient length, while the other hand of the operator can readily actuate the lever 16 for manipulating the valve 13 to the required operating positions to entrain and discharge milk quantities in the manner described.

Having thus described the invention so that those skilled in the art will be able to practice the same, what I desire to secure by Letters Patent is defined in what is claimed, it being understood that various changes in the device shown and described in detail and not amounting to invention, may be made without departing from the spirit and scope of my invention.

What I claim is:

1. An entraining and discharging apparatus for collecting liquid sediments, comprising a container having an inserted porous disc at one end, a two position valve mounted at the other end of the container and having a fluid pressure connection, the valve mounting end of the container being provided with a plurality of ports with which said valve is selectively cooperable in one of its positions, to create a suction in said container to entrain liquid past said disc and into the container, said valve in its other position in respect to said ports creating a pressure on the entrained liquid in said container to cause its discharge from the container.

2. An entraining and discharging apparatus for collecting liquid sediments, comprising a container having a head at one end with a body portion thereon, a removably mounted porous disc at the other end of said container, said body portion having a bore with a plurality of ports one of which opens into the container valve provided with a plurality of ports and mounted in the bore of said body portion and having a fluid pressure connection with one of its ports, said valve in one of its positions in the bore of said body portion having its ports communicating with the body portion ports for creating a suction in said container to entrain liquid into said container, said valve when positioned in said body portion with its fluid pressure connection port in alinement with the body portion container port, creating a pressure on the entrained liquid to cause its discharge from the container and through said disc, said valve also being so constructed as to be capable of moving to a cut-off position in said body portion with respect to the ports thereof.

3. An entraining and discharging apparatus for collecting liquid sediments comprising a container having a valve mounting end and a liquid admitting and discharging end; a two position valve mounted at the valve mounting end of the container and having a fluid pressure connection; the valve mounting end of the container being provided with a plurality of ports with which said valve is selectively cooperable in one of its positions, to create a suction in said container to entrain liquid into the container; said valve in its other position in respect to said ports, creating a pressure on the entrained liquid in said container, to cause its discharge from the container.

4. An entraining and discharging apparatus for collecting liquid sediments comprising a container having a valve mounting wall and a passageway in another of its walls; a two position valve mounted in the valve mounting wall of the container and having a fluid pressure connection; the valve mounting wall of the container being provided with a plurality of ports with which said valve is selectively cooperable in one of its positions, to create a suction in said container to entrain liquid therein; said valve in its other position in respect to said ports, creating a pressure on the entrained liquid in said container, to cause its discharge from the container.

NICOLAS FERRAEZ, Jr.

REFERENCES CITED

The following references are of record in the file of this patent:

UNITED STATES PATENTS

| Number | Name | Date |
|---|---|---|
| 2,187,514 | Gardner | Jan. 16, 1940 |
| 2,225,984 | Erekson | Dec. 24, 1940 |
| 2,345,290 | Roesch | Mar. 28, 1944 |
| 2,055,252 | Ferraez, Jr. | Sept. 22, 1936 |

FOREIGN PATENTS

| Number | Country | Date |
|---|---|---|
| 263,647 | Great Britain | Jan. 6, 1927 |